(12) United States Patent
El Hamel et al.

(10) Patent No.: US 7,107,755 B2
(45) Date of Patent: Sep. 19, 2006

(54) ENGINE ARRANGEMENT

(75) Inventors: Karim El Hamel, Derby (GB); Arnold C Newton, Derby (GB)

(73) Assignee: Rolls-Royce plc, London (GB)

( * ) Notice: Subject to any disclaimer, the term of this patent is extended or adjusted under 35 U.S.C. 154(b) by 156 days.

(21) Appl. No.: 10/207,796

(22) Filed: Jul. 31, 2002

(65) Prior Publication Data

US 2004/0035098 A1 Feb. 26, 2004

Related U.S. Application Data

(63) Continuation of application No. PCT/GB01/00473, filed on Feb. 7, 2001.

(30) Foreign Application Priority Data

Feb. 9, 2000 (GB) .................. 0002825.8

(51) Int. Cl.
*F02K 3/00* (2006.01)
*F02K 7/00* (2006.01)
*F02K 9/00* (2006.01)
*F02K 9/74* (2006.01)
*F02K 9/76* (2006.01)

(52) U.S. Cl. .............................. 60/224; 60/797; 244/55
(58) Field of Classification Search ................. 60/796, 60/797, 226.1, 224; 244/55, 56, 66, 12.3, 244/12.4, 12 B, 12 D, 12 R, 23 B, 23 D, 244/53 B, 54, 15
See application file for complete search history.

(56) References Cited

U.S. PATENT DOCUMENTS

| | | | |
|---|---|---|---|
| 3,201,069 A * | 8/1965 | Haskin .......................... | 244/54 |
| 3,519,227 A | 7/1970 | Brooks | |
| 3,809,340 A * | 5/1974 | Dogly et al. .................. | 244/54 |
| 3,905,566 A * | 9/1975 | Anderson .................. | 244/53 B |
| 3,972,490 A | 8/1976 | Zimmermann | |
| 3,995,794 A * | 12/1976 | Lanier ......................... | 244/12.4 |
| 4,209,149 A * | 6/1980 | Morris et al. .............. | 244/53 B |
| 4,966,338 A * | 10/1990 | Gordon ........................ | 244/54 |
| 5,181,675 A * | 1/1993 | Lardellier et al. ............. | 244/54 |
| 5,275,357 A * | 1/1994 | Seelen et al. .................. | 244/54 |
| 5,303,880 A * | 4/1994 | Cencula et al. ................. | 244/54 |
| 5,372,338 A * | 12/1994 | Carlin et al. ................... | 244/54 |
| 5,374,010 A * | 12/1994 | Stone et al. ................ | 244/12.5 |
| 5,443,230 A * | 8/1995 | Lord et al. ..................... | 244/54 |
| 5,497,961 A * | 3/1996 | Newton ........................ | 244/54 |
| 5,620,154 A * | 4/1997 | Hey ............................ | 244/54 |
| 5,927,644 A * | 7/1999 | Ellis et al. ..................... | 244/54 |
| 6,102,328 A * | 8/2000 | Kumata et al. ........... | 244/45 R |
| 6,129,309 A * | 10/2000 | Smith et al. .............. | 244/53 B |
| 6,220,546 B1 * | 4/2001 | Klamka et al. ............ | 244/129.4 |
| 6,308,913 B1 * | 10/2001 | Fujino et al. ............. | 244/45 R |
| 6,330,995 B1 * | 12/2001 | Mangeiga et al. .......... | 248/554 |
| 6,394,392 B1 * | 5/2002 | Lafferty .................... | 244/118.1 |
| 6,474,596 B1 * | 11/2002 | Cousin et al. ................. | 244/54 |
| 6,523,352 B1 * | 2/2003 | Takahashi et al. ............ | 60/796 |
| 6,543,718 B1 * | 4/2003 | Provost ..................... | 244/12.4 |

FOREIGN PATENT DOCUMENTS

| GB | XP000865161 Y | 11/1999 |
|---|---|---|
| GB | XP002166337 Y | 5/2001 |

* cited by examiner

*Primary Examiner*—William H. Rodriguez
(74) *Attorney, Agent, or Firm*—W. Warren Taltavull; Manelli Denison & Selter PLLC

(57) ABSTRACT

An engine arrangement (14) comprises a gas turbine engine unit (16) and first and second support members (18, 20) extend from a structural component (24) of the engine casing (22) to support the engine unit in a position spaced from the body or airframe of the aircraft.

12 Claims, 5 Drawing Sheets

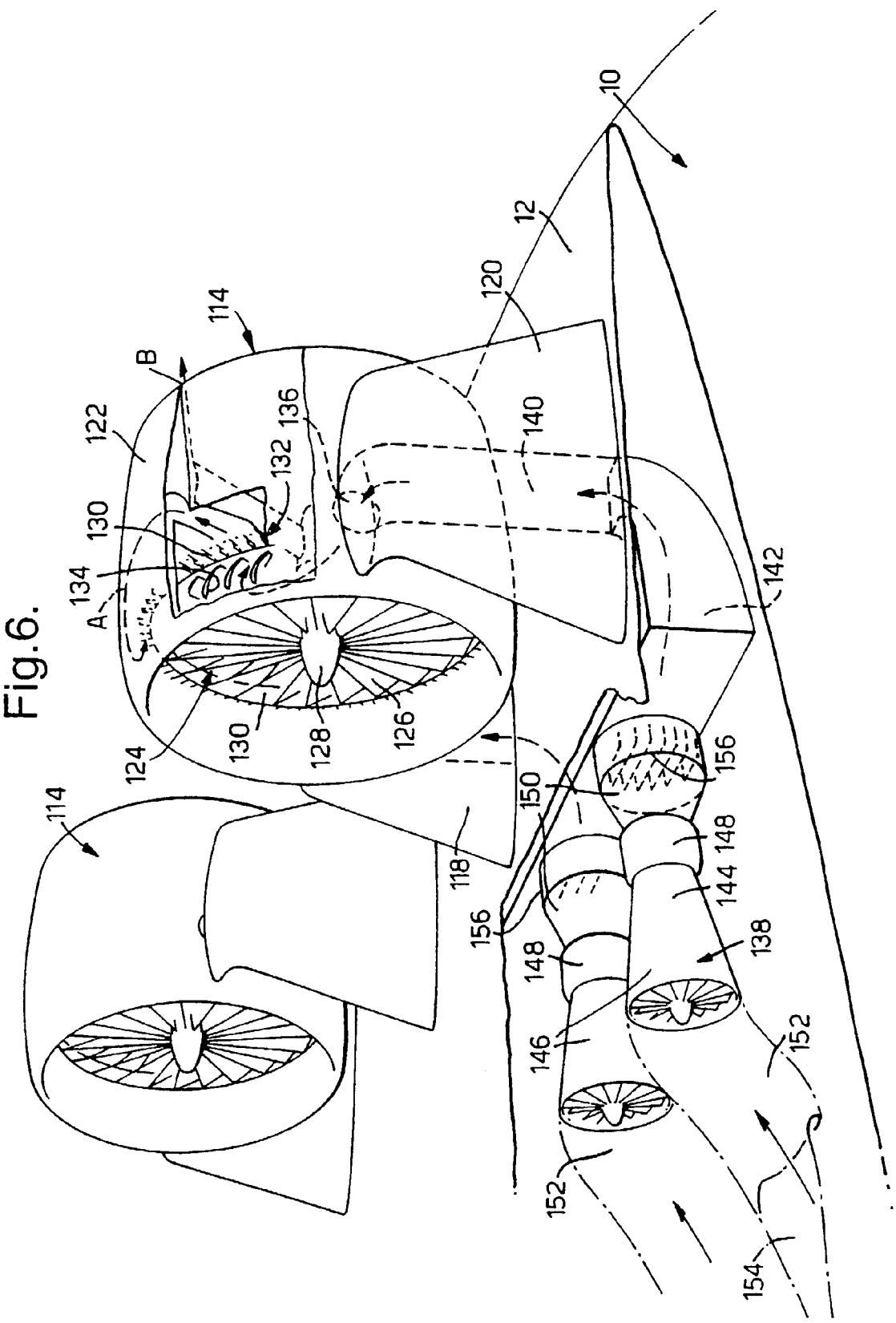

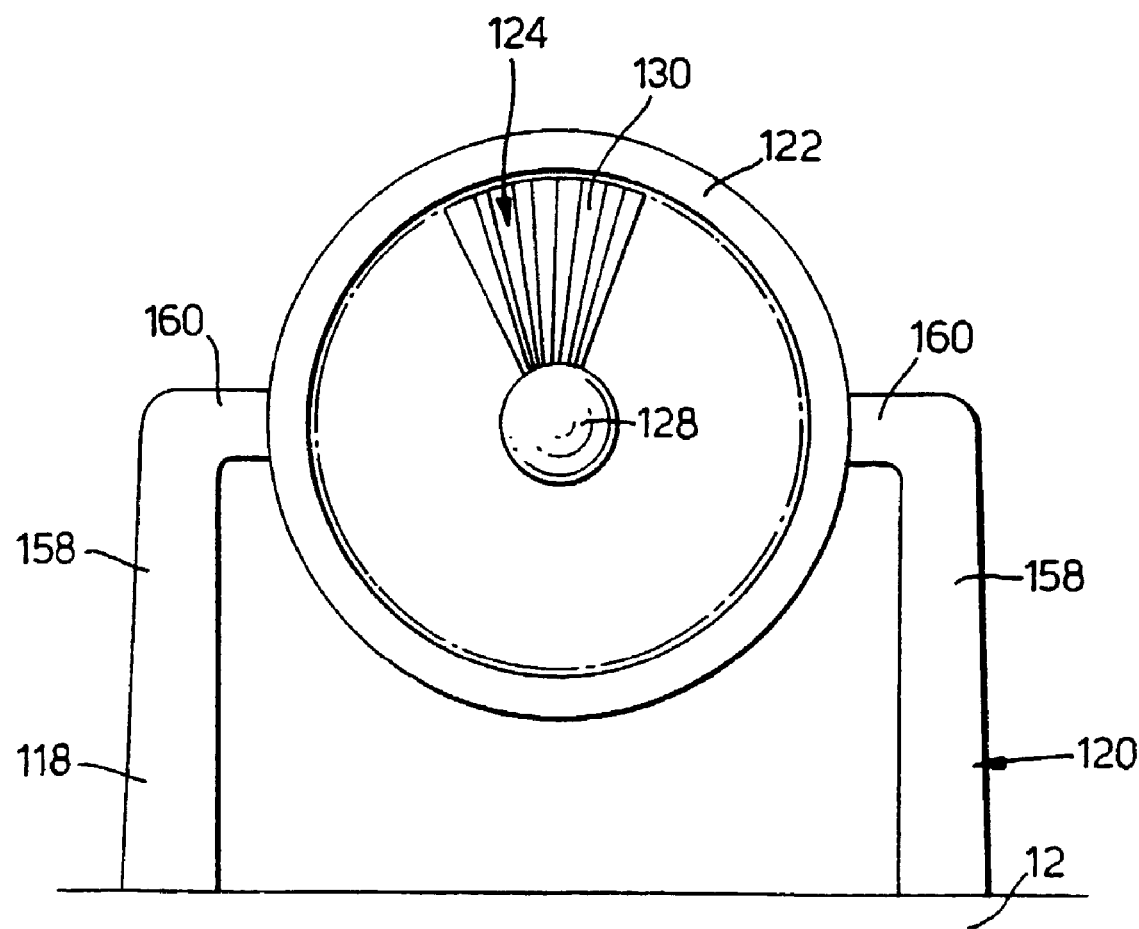

ENGINE ARRANGEMENT

This is a Continuation International Appln. No. PCT/GB01/00473 filed Feb. 7, 2001.

FIELD OF THE INVENTION

This invention relates to engine arrangements. More particularly, but not exclusively, the invention relates to engine arrangements for blended wing-body aircraft.

BACKGROUND OF THE INVENTION

The development of so-called blended wing-body aircraft requires the engine to be supported above the surface of the airframe. The use of conventional supports for engines can cause problems if used for blended wing-body aircraft.

SUMMARY OF THE INVENTION

According to one aspect of this invention there is provided an engine arrangement comprising a gas turbine engine unit and first and second spaced apart support members extending from a load bearing component of the engine unit and adapted for connection to a load bearing component of an airframe of an aircraft to support the engine unit in a position spaced from the airframe of the aircraft.

Preferably said load bearing component of the engine unit comprises at least a portion of a generally cylindrical engine casing or nacelle. The first and second support members are preferably connected to said casing at locations substantially diametrically opposite one another.

Each of the first and second support members conveniently extends along at least a major proportion of the axial length of the casing and preferably extends along substantially the whole length of the casing.

Each support member may comprise a generally planar member which may be in the form of a panel member which may have one or more apertures therein. The size of the aperture or apertures may form a major proportion of the size of the panel. One or both of the planar members may be in the form of a frame defining one or more such apertures.

The planar member may be generally rectangular or trapezoidal in configuration, or may be in the form of a rhombus or may be generally rhomboidal in configuration. In one embodiment, each planar member extends generally tangentially from the casing of the engine unit. In an alternative embodiment, each support member includes a mounting portion extending generally radially of the casing and serving to connect the planar member to the casing, each support member thus being of generally L-shaped cross-section.

Generally the engine unit will comprise a complete gas turbine engine. However in an alternative arrangement the engine unit may comprise a fan and an associated turbine only, the other components of the engine being mounted elsewhere on the aircraft.

The invention also provides an aircraft comprising an airframe and an engine arrangement as aforesaid mounted thereon. Preferably the engine arrangement is mounted above the airframe. Advantageously the aircraft is a blended wing-body aircraft having at least two said engine arrangements mounted above and at the rear of the airframe.

BRIEF DESCRIPTION OF THE DRAWINGS

Embodiments of the invention will now be described by way of example only with reference to the accompanying diagrammatic drawings, in which:

FIG. 6 is a perspective view of a further embodiment of engine arrangement; and

FIG. 7 is a front view of one of the engines shown in FIG. 6.

DETAILED DESCRIPTION OF THE INVENTION

Figure 1:
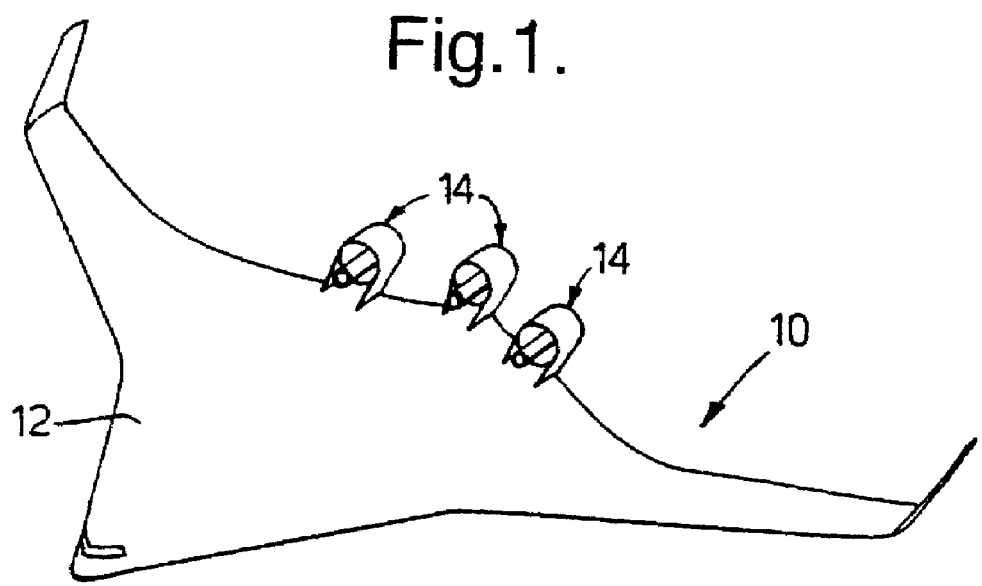
FIG. 1 is a perspective view of a blended wing-body aircraft.

Referring to FIG. 1, there is shown a blended wing body aircraft 10 comprising an airframe 12, and three engine arrangements 14 mounted on and to the rear of the airframe 12.

Figure 2:
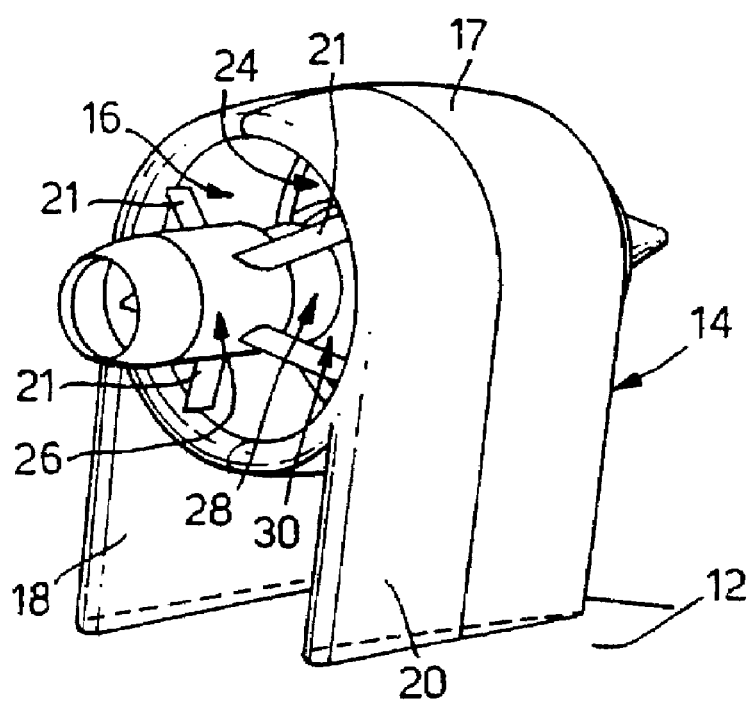
FIG. 2 is a perspective view of an engine arrangement for mounting on the aircraft shown in FIG. 1.

Referring to FIG. 2, there is shown an example of one of the engine arrangements 14 which comprises a gas turbine engine 16 having a casing 17 and first and second support members 18, 20 extending downwardly from the casing 17, whereby the gas turbine engine 16 is spaced from the airframe 12 by the support members 18, 20.

The engine 16 is an aft fan gas turbine engine including a fan assembly 24 surrounded by the casing 17 and a compressor assembly 26 extending forwardly of the casing 17.

The compressor assembly 26 includes intermediate and high pressure compressors. A combustor assembly 28 is provided downstream of the compressor assembly 26 to combust the gases exiting the high pressure compressor. A turbine assembly 30 is provided downstream of the combustor assembly 28 and comprises high and intermediate pressure turbines. The turbine assembly 30 is driven by the gases exiting the combustor assembly 28 and in turns drives the high and intermediate pressure compressors of the compressor assembly 26.

Downstream of the turbine assembly 30 is a low pressure turbine which is arranged concentrically within the fan assembly 24. The low pressure turbine is driven by the gases exiting the turbine assembly 30 and drives the fan assembly 24. In the embodiment shown, the casing 17 surrounds the combustor and turbine assemblies 28 and 30, as well as the fan assembly 24. The engine 16 may include a plurality of forward load bearing struts 21 and a plurality of rear load bearing struts (not shown) which transmit thrust loads from the engine to the casing 17. The casing 17 transmits the thrust loads to the support members 18, 20. At least the regions of the casing 17 to which the support members 18, 20, as well as the forward load bearing struts 21 and the rear load bearing struts, are connected is a load-bearing or structural component of the engine. In the preferred embodiment, substantially the whole casing 17 is capable of bearing thrust loads from the engine.

The support members 18, 20 are in the form of pylons and extend downwardly from the engine casing 22 to which they are connected at locations generally diametrically opposite each other. Each of the support members 18, 20 is in the form of a generally planar member which extends substantially tangentially from the casing 17.

Figure 3A:
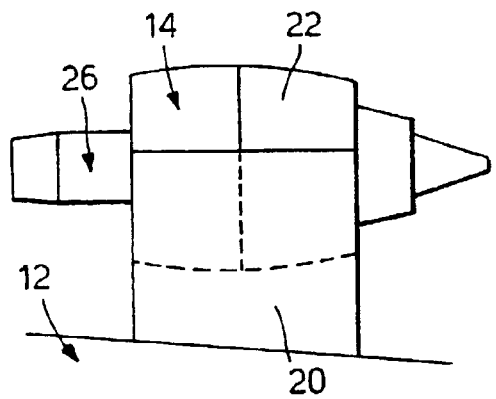
FIGS. 3A and 3B are side views of alternative embodiments of the invention.
Figure 3B:
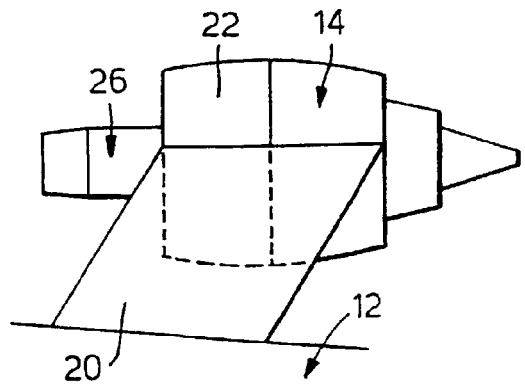

FIGS. 3A and 3B show two embodiments of planar support members 18, 20. In FIG. 3A, the planar support members 18, 20 extend directly downwardly from the casing 22, and each is of a generally rectangular configuration. In the embodiment shown in FIG. 3B, the support members 18, 20 extend downwardly from the casing 22 and towards the forward end of the engine 16, thereby being of rhomboidal shape.

Figure 4A:
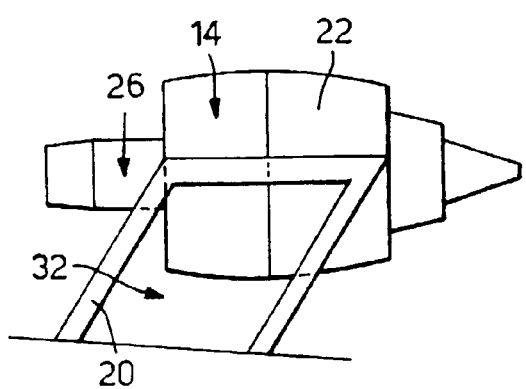
FIGS. 4A, 4B and 4C show further alternative engine arrangements.
Figure 4B:
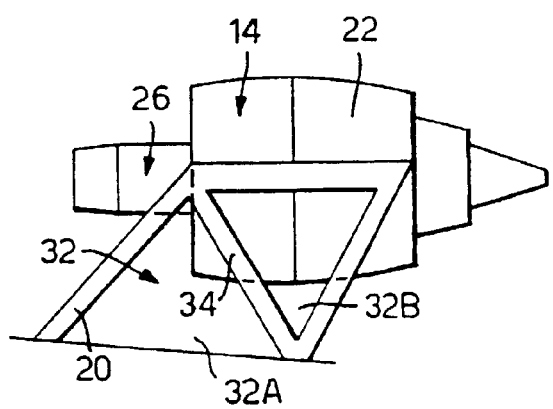
Figure 4C:
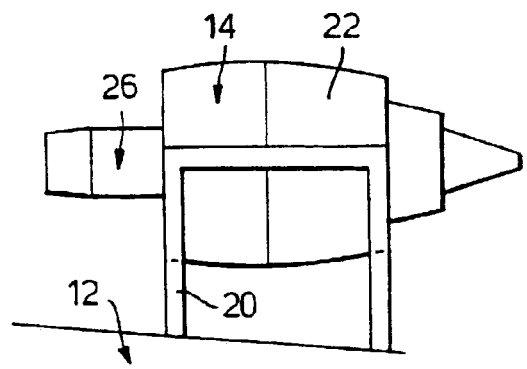

Further embodiments of the support members 18, 20 are shown in FIGS. 4A, 4B and 4C. In FIGS. 4A to 4C, each support member 18, 20 is in the form of a frame, defining an aperture or apertures that extend laterally therethrough. In FIG. 4A, the support members are of rhomboidal configuration and provided with a single aperture 32 which extends over a major proportion of the area of the support member. An alternative embodiment is shown in FIG. 4B in which each support member is also of a rhomboidal configuration but incorporates two apertures 32A, 32B separated by a strengthening strut 34 extending diagonally across the support member 20.

A further embodiment is shown in FIG. 4C in which each support member is of a generally rectangular overall configuration, and incorporates a single aperture 32 extending over a major proportion thereof resulting in a support member in the form of a frame of inverted U-shaped configuration. A particular benefit of the apertured support members shown in FIGS. 4A, 4B and 4C is a reduction in aerodynamic problems in non-symmetrical air flow conditions.

Figure 5A:
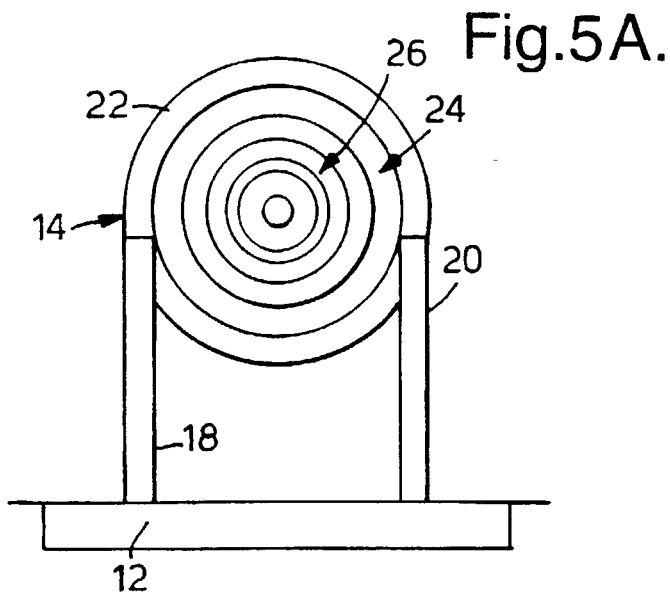
FIGS. 5A, 5B and 5C are front views of yet further alternative engine arrangements.
Figure 5B:
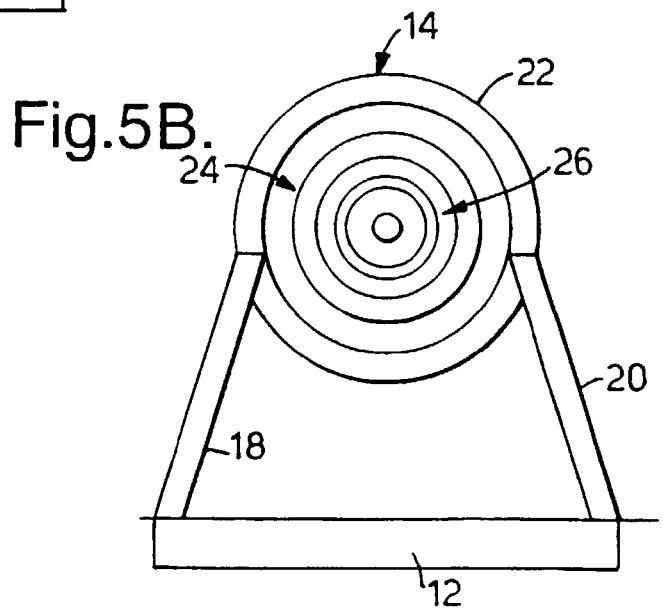
Figure 5C:
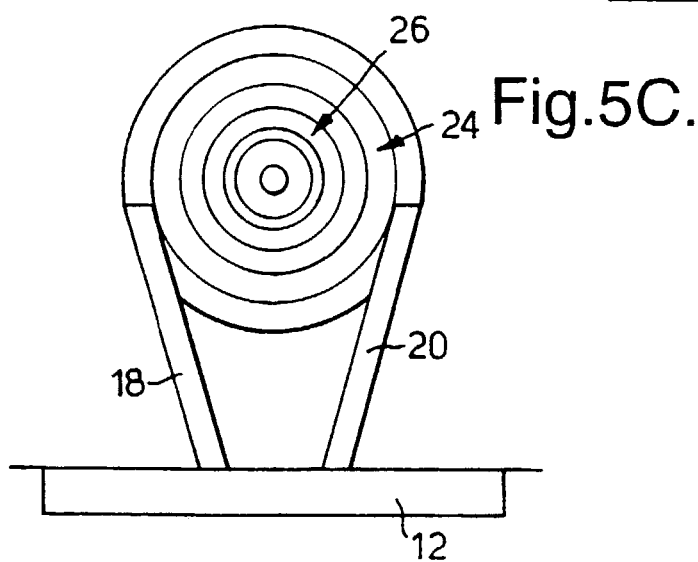

Referring to FIGS. 5A, 5B and 5C, there are shown different embodiments of support members 18, 20 when viewed from the front of the engine 16. In FIG. 5A, each of the support members 18, 20 extend vertically downwardly from the casing 22, generally parallel to each other, and substantially perpendicular to the airframe 12. In the embodiment shown in FIG. 5B, the support members 18, 20 extend outwardly from the casing 22 and diverge downwardly to the airframe 12. In FIG. 5C, the support members 18, 20 extend inwardly from the casing 22 and converge downwardly to the airframe 12. In all these cases the supports 18, 20 may be constructed in any of the manners shown in FIGS. 2, 3A, 3B, 4A, 4B or 4C.

A further embodiment is shown in FIG. 6 which shows two engine arrangements 114 mounted on the airframe 12 of a blended wing-body aircraft 10. Each engine arrangement 114 comprises an engine unit comprising a fan assembly 124 surrounded by a casing 122. A pair of substantially diametrically opposed support members 118, 120 extend downwardly from the casing 122 to the airframe 12. The fan assembly 124 is in the form of a tip driven fan, an example of which is described in U.K. Patent Specification No. 1324240. In essence, the tip driven fan 124 comprises a plurality of fan blades 126 mounted on bearings on a shaft 128. An annular shroud 130 is fixedly mounted on and interconnects the fan blades at the peripheries thereof. A plurality of turbine blades 132 are carried on the outer surface of the annular shroud 130 and form a turbine assembly 132 also housed within the casing 122.

Air is directed to a plurality of nozzle guide vanes 134 via an aperture 136 in the wall of the casing 122 which is connected to the core 138 of the engine by a channel 140 and a plenum chamber 142. The operation of the core 138 of the engine will be described below.

The driving gas for the turbine blades 132, and hence the fan blades 124 is provided by a pair of engine core assemblies 138 which are separate from the fan assembly 124 and mounted within the body of the aircraft 10.

Each core assembly comprises a gas generator 144 incorporating, in axial flow series, a compressor assembly 146, a combustor assembly 148, and a turbine assembly 150. Each compressor assembly 146 is in fluid communication with the exterior of the aircraft via an intake duct 152 and intake aperture 154 on the underside of the aircraft 10.

The turbine assemblies 150 are connected to a common plenum chamber 142 via respective exhaust ducts 156 provided with valves to prevent backflow of air into the turbine assemblies 150. Thus, air is passed through each core assembly 138 of the engine to the plenum chamber 142 and thereafter into conduits 140 housed within the respective support member 118, 120 to the fan assembly 124. Each of the support members 118, 120 is provided with a respective channel 140 so that air can be directed to opposite sides of the fan assembly 124.

The air entering the fan assembly via the apertures 136 is directed via the nozzle guide vanes 134 on to the turbine blades 130 in a double pass arrangement, as indicated by the arrow A and thereafter is exhausted from the rear of the fan assembly 124 as shown by the arrow B via an annular slot extending around the trailing edge of the casing 122.

As can be seen from FIG. 6, each of the support members 118, 120 extends along a major proportion of the length of the casing 122, and each of the planar portions is of a generally trapezoidal configuration. FIG. 7 is a front view of one of the fan assemblies 124 and associated support members 118, 120. As can be seen, each of the support members 118, 120 is in the form of a substantially L-shaped member and comprises a generally vertical planar portion 158 and an inwardly extending portion 160 connecting the planar portion 158 to the casing 122.

By virtue of the arrangements described, engines of substantial size and weight may be mounted on aircraft in a rigid, structurally efficient and better integrated manner compared with mounting arrangements previously employed. In the case of blended wing-body and other aircraft the engines may be top mounted and located well clear of the fuselage thus improving aerodynamics and improving engine access for maintenance, repair or replacement. The support members also provide an additional debris shield in the event of engine failure.

Various modifications can be made without departing from the scope of the invention. For example, in the embodiments shown in FIGS. 4A and 4B, the apertures could be of circular or other shapes. Moreover while the various embodiments of the invention have been described with reference to an aft fan contra-rotating engine, it will be appreciated that it is equally suitable for use with other types of engine. Moreover, although reference has been made herein to the mounting of an engine on a blended wing-body aircraft, the invention is also suitable for use with other types of aircraft, and can be used to support engines either above or below the airframe.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An engine arrangement for an aircraft, the aircraft comprising an airframe, the airframe comprising a load bearing component; a gas turbine engine unit comprising a load bearing component; wherein first and second spaced apart support members extend from the load bearing component of the engine unit and are connected to the load bearing component of the airframe of the aircraft to support the engine unit in a position spaced from the airframe of the aircraft, without any further support for said engine unit, wherein the load bearing component of the engine unit comprises at least a portion of a generally cylindrical engine casing or nacelle, and the first and second support members are connected to the casing at locations substantially on diametrically opposite sides of said casing wherein each of the first and second support members extends along at least a major proportion of the axial length of the casing.

2. An engine arrangement according to claim 1 wherein each support member comprises a generally planar member.

3. An engine arrangement according to claim 2, wherein each support member includes a radially inwardly extending mounting member serving to connect the planar member to the engine unit.

4. An engine arrangement according to claim 1, wherein the support members extend generally tangentially from said casing.

5. An engine arrangement according to claim 1, wherein the support members are one of inwardly inclined and outwardly inclined from their point of connection to said casing.

6. An engine arrangement according to claim 1, wherein said support members extend forwardly relative to said casing.

7. An engine arrangement according to claim 1, wherein said engine unit comprises a gas turbine engine.

8. An engine arrangement according to claim 1, wherein said engine unit comprises a fan and an associated turbine, the engine unit being adapted for connection to other components of the engine located elsewhere on the aircraft.

9. An aircraft comprising an airframe and an engine unit arrangement as claimed in claim 1 mounted thereon.

10. An aircraft according to claim 9, wherein said engine unit is mounted above the airframe.

11. An aircraft according to claim 9, wherein each engine arrangement is an aft fan contra-rotating engine.

12. A blended wing-body aircraft having at least two engine arrangements according to claim 1 mounted above and at the rear of the airframe.

* * * * *